Sept. 4, 1962  C. R. VANDER LINDEN ETAL  3,052,563
CALCIUM SILICATE PRODUCT AND METHOD OF PREPARING THE SAME
Filed Oct. 12, 1959  2 Sheets-Sheet 1
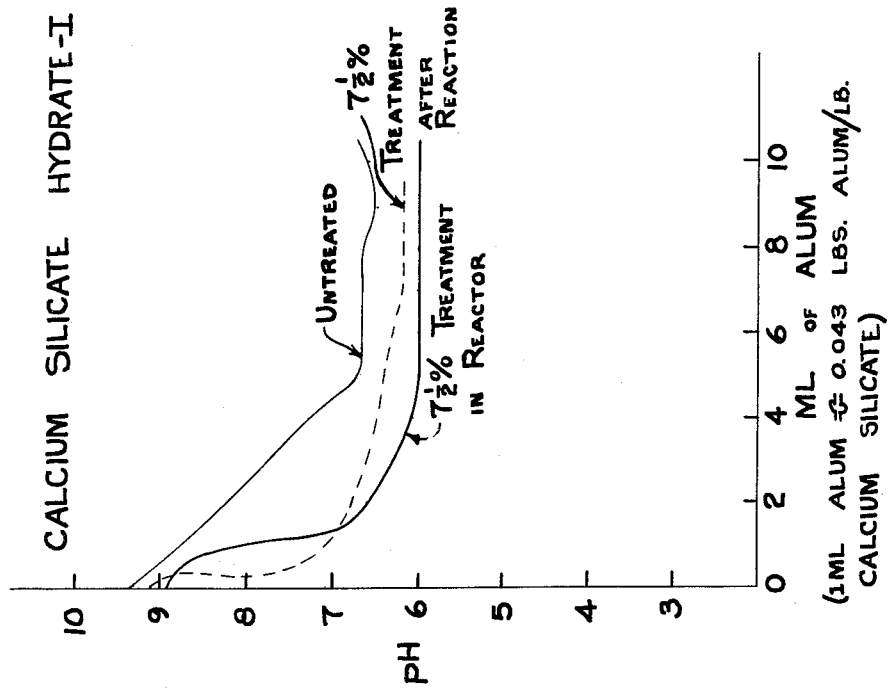
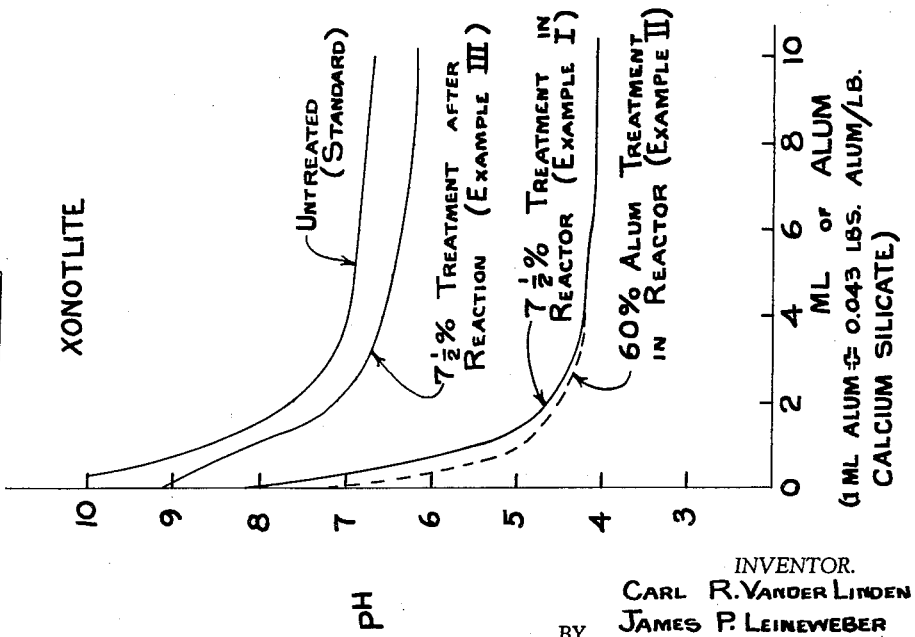
INVENTOR.
CARL R. VANDER LINDEN
JAMES P. LEINEWEBER
BY
John A. McKinney
ATTORNEY Sept. 4, 1962  C. R. VANDER LINDEN ETAL  3,052,563
CALCIUM SILICATE PRODUCT AND METHOD OF PREPARING THE SAME
Filed Oct. 12, 1959  2 Sheets-Sheet 2
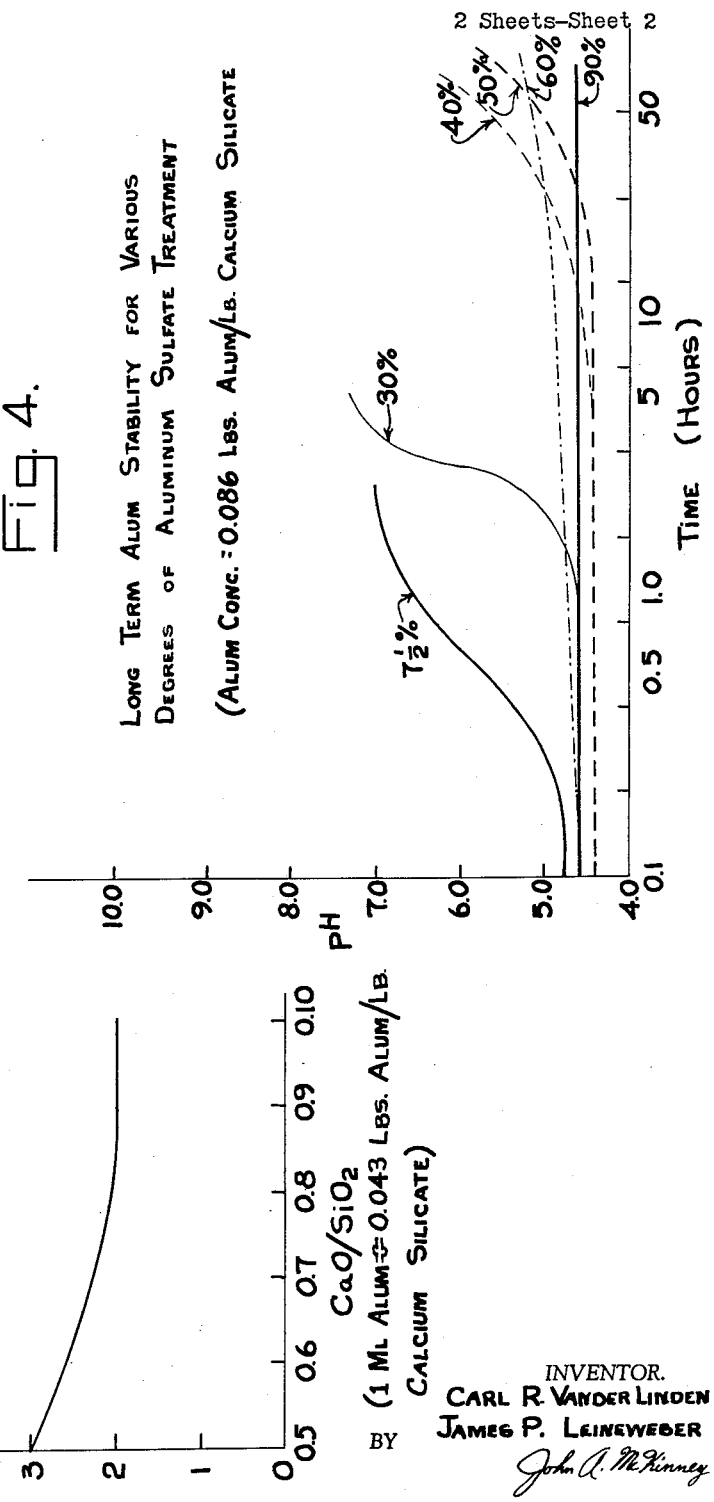
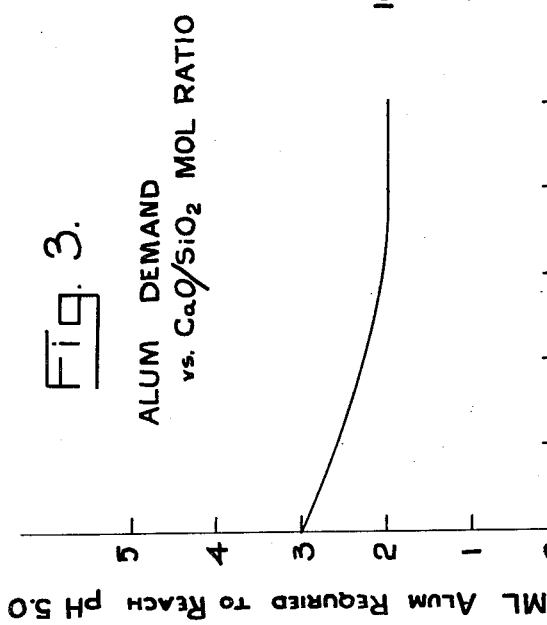
INVENTOR.
CARL R. VANDER LINDEN
JAMES P. LEINEWEBER
BY
John A. McKinney
ATTORNEY

United States Patent Office 3,052,563
Patented Sept. 4, 1962

3,052,563
CALCIUM SILICATE PRODUCT AND METHOD
OF PREPARING THE SAME
Carl R. Vander Linden, Bound Brook, and James P. Leineweber, Somerville, N.J., assignors to Johns-Manville Corporation, New York, N.Y., a corporation of New York
Filed Oct. 12, 1959, Ser. No. 845,821
19 Claims. (Cl. 106—306)

This invention relates to improved hydrated calcium silicate products and their preparation. More particularly, the invention is concerned with an improved method of buffering the basic characteristics of hydrated calcium silicates and products thereof.

Particulate hydrated calcium silicates have for some time been proposed for use as fillers, pigments, extenders, etc., for paint, paper, rubber, plastic, and the like products and in some applications such silicates have been found effective to varying degrees. However, many calcium silicate compositions now available typically exhibit one or more properties such, for example, as relatively high solubilities, high alkalinity or basic pH, among others, which render them unsatisfactory and/or impractical, and frequently inoperative in many applications or products wherein a substantially completely insoluble or "inert" and/or approximately neutral or even acid filler or pigment possessing other properties not unlike those of the highly absorptive calcium silicates could effectively and economically fulfill many filler, pigment or extender requirements in the paint, paper, rubber, plastic and allied industries.

Efforts to overcome various of the noteworthy disadvantages of the more common hydrated calcium silicate products in particular applications and thereby extend their scope of utility have to date been met with little success. For example, pre-treatment of highly basic hydrated calcium silicate compounds by contacting the same with an acid material such as alum, sulfuric acid or the like, has heretofore been proposed as a means of rendering calcium silicates suitable for use in products or processes which involve or require a low or acid pH medium. Such a pretreatment of the conventional hydrated calcium silicates, however, has proven to be relatively ineffective and/or uneconomical in that amounts of acid material approximately sufficient to decompose or react with substantially all of the calcium silicate product are typically required to effectively reduce the pH of an aqueous slurry of the silicate to about 4–5. In other words, substantially stoichiometric quantities of an acid material are required to materially reduce the high pH values of an aqueous suspension of calcium silicate and maintain the same at a low pH value. Thus, a partial pre-treatment of a calcium silicate with amounts of an acid material lacking stoichiometric proportions, in preparing the same for application in a process or product requiring an acid medium such as paper-making slurries, typically results in a product which, if desirable or essential to maintain at a low or acid pH, requires a subsequent addition(s) of substantial proportions of an acid-imparting material in amounts which when totaled with the pre-treatment acid component approaches uneconomical stoichiometric proportions.

It is an object of this invention to provide an improved method of preparing alum treated hydrated calcium silicates and the products thereof.

It is also an object of this invention to provide an effective and economical method of buffering the basic characteristics of stable high temperature phase hydrated calcium silicate products.

It is a further object of this invention to modify the surface characteristics of slow filtering high temperature phase hydrated calcium silicates to materially improve their filtering rates.

It is a still further object of this invention to provide stable high temperature phase hydrated calcium silicate products exhibiting relatively low pH characteristics which, among other advantages and potential application, comprises effective and economical fillers, pigments, and/or extenders for paint, paper, rubber, plastic, and the like products.

This invention will be more fully understood and further objects and advantages thereof will become apparent from the hereinafter more detailed description and specific examples taken in connection with the accompanying drawings, in which:

FIG. 1 illustrates the relative effectiveness of the treatment of this invention and the pH characteristics of the products of said treatment in comparison with those of procedures not within the scope of this invention;

FIG. 2 illustrates the unreceptiveness of low temperature phase hydrated calcium silicate products such as calcium silicate hydrate I to all types of treatment including the novel method of this invention;

FIG. 3 compares the relative effectiveness of the method of this invention as applied to various high temperature phase hydrated calcium silicate compositions; and FIG. 4 illustrates the long term alum stability of products treated in accordance with this invention.

Typical hydrated calcium silicate products when subjected to an aqueous acid medium in the performance of a process or in the preparation of a product, for example a paper-making furnish wherein alum (aluminum sulfate) is often added to maintain the pH of the furnish within the approximate range of 4–6, react with the acidic component(s) of said medium with a resultant overall increase in pH. Thus, whenever essential, or even desirable to maintain or restore the low pH condition of the medium, an additional amount of the acidic or acid producing component must be added thereto to restore or maintain the pH at the desired or original level. Such a practice is often costly and therefore prohibitive in many manufacturing procedures or products.

This invention provides new hydrated calcium silicates exhibiting relatively low pH characteristics, among other advantageous properties, which are peculiarly adaptable for use as fillers, pigments, extenders, etc., in products or processes involving or necessitating relatively low or acid pH mediums. The novel silicate products of this invention are produced by treating or reacting stable, high temperature phase hydrated calcium silicate compounds with aluminum sulfate at temperatures of at least about 350° F. and preferably within the approximate range of 450° to 550° F. A temperature of about 450° F. is most preferred for reasons of efficiency and economy. Further, the treatment or reaction should comprise sufficient aluminum sulfate and be permitted to proceed to a point wherein at least 5% by weight of the calcium oxide component of the particular silicate has reacted with aluminum sulfate, it being understood that the theoretical stoichiometric proportions of aluminum sulfate and calcium oxide comprise 1 mol of aluminum sulfate per 3 mols of calcium oxide. The degree to which it is desirable or appropriate to extend the aluminum sulfate treatment beyond the foregoing stated 5% minimum, however, depends upon the requirements desired of the ultimate product.

As stated hereinbefore the high temperature aluminum sulfate treatment of this invention is only effective when applied to high temperature phase hydrated calcium silicate compounds, viz., hydrothermal reaction products of an aqueous suspension of lime and a reactive siliceous material, such as a diatomaceous earth quartz, etc., at temperatures of at least about 370° F. and preferably approximately 450° F. Exemplary of suitable high temperature phase calcium silicate compounds are the calcium silicate xonotlite ($5CaO.5SiO_2.H_2O$) and a very low solubility calcium silicate compound having the formula $2CaO.3SiO_2.1—2.5H_2O$ and a distinguishing X-ray diffraction pattern having very strong lines $d=3.12$ A. and $d=4.12$ A. and a medium line at $d=8.3$ A. described in copending United States patent application Serial No. 736,203, filed May 19, 1958, now United States Letters Patent No. 2,966,441. The foregoing high temperature phase compounds may be prepared by the hydrothermal reaction of lime and a source of reactive silica in the respective mol ratios of 1 mol of CaO per mol of $SiO_2$ and 0.5–0.7 mol of CaO per mol of $SiO_2$ in aqueous suspension at temperatures of at least about 370° F., preferably 450° F., for periods typically of about 2 hours. By varying the mol ratios of the reactive lime and siliceous components calcium silicate products comprising mixtures of the various stable, high temperature phase hydrated calcium silicates may be produced and such mixtures are likewise applicable in the practice of this invention.

The extent to which the foregoing aluminum sulfate treatment of the hydrated calcium silicate may be effected depends, naturally, upon the relative proportions or mol ratios of aluminum sulfate added to the calcium silicate compound and as such can range from uneconomical stoichiometric proportions, i.e., substantially complete or total reaction or consumption of all the available calcium oxide component of the calcium silicate consisting of 1 mol of $Al_2(SO_4)_3$ per 3 mols of CaO, down through any proportions or percentages thereof to the lowest effective limit of at least about 5% of the calcium oxide content of the particular calcium silicate compound. Suitable aluminum sulfate treated calcium silicate products for many applications comprise those resulting from a treatment with sufficient aluminum sulfate to react with approximately 7½% of the available calcium oxide of the particular silicate (i.e., about 0.025 mol $Al_2(SO_4)_3$ per mol of CaO).

The effectiveness of the foregoing aluminum sulfate treatments as well as that of previous methods, i.e., the extent or degree to which said treatments reduce or suppress the basic pH characteristics of the treated calcium silicate product, may be measured by the amount of aluminum sulfate required either to reduce a slurry of a given amount of an aluminum sulfate treated calcium silicate to a predetermined pH, or the maintain a predetermined maximum pH for a slurry or aqueous medium following the addition thereto of an aluminum sulfate treated calcium silicate. The effectiveness or extent which the treatment reduces or suppresses the basic pH characteristics of the treated calcium silicate and appropriate means for measuring the same are referred to hereinafter as the "alum demand" of the aluminum sulfate treated or buffered calcium silicate. The specific test utilized in determining the "alum demand" of the treated calcium silicates in the following examples and throughout the specification, unless indicated otherwise, comprises adding to a ½ gram sample of the particular aluminum sulfate treated calcium silicate slurried in 400 ml. of water, 1 ml. increments of aluminum sulfate solution containing 0.0216 gram of hydrated aluminum sulfate ($Al_2(SO_4)_3.18H_2O$) per ml. and determining the pH after stirring for 5 minutes. The "alum demand" is expressed as the mls. of aluminum sulfate solution which must be added to reduce the pH of the slurry to 5.0.

The aluminum sulfate treatment of stable, high temperature phase hydrothermally prepared hydrated calcium silicate compounds may be effected in substantially any convenient or appropriate manner it being essential only that the high temperature phase hydrated calcium silicate and aluminum sulfate are reacted in an aqueous medium at temperatures of at least about 350 F. and preferably approximately 450° F. Moreover, the aluminum sulfate treatment may be practically and economically carried out in the same reactor vessel or chamber utilized to synthesize the high temperature calcium silicate simply by adding an aqueous solution of aluminum sulfate directly to said reactor upon substantial completion of the hydrothermal formation of the hydrated calcium silicate product and maintenance of the synthesizing temperatures. Such a procedure, addition of the aluminum sulfate directly to the hot reactor vessel contents, provides a substantial savings over subsequent heating of all components to a suitable reaction temperature.

The aluminum sulfate reagent suitable for carrying the invention into effect may comprise ordinary "papermaker's alum" or any of the commercial grades of aluminum sulfate available on the market.

The mechanism of this invention being somewhat problematical, the following theoretical explanation is given for purposes of illustration rather than limitation. However, extensive observations indicate that the treatment of stable, high temperature phase hydrated calcium silicates with aluminum sulfate at the specified necessary temperatures results in a reaction product(s) of the aluminum sulfate and calcium silicate forming a protective coating on or modification of the surfaces of the hydrated calcium silicate particles providing the same with effective resistance from further acid attack.

The following examples illustrate the present invention including several variations in the practice of the same, and compare the invention with certain known prior art particles and other procedures outside the scope of this invention. It is to be understood that the hereinafter examples are given for purposes of illustration rather than limitation and that the specified techniques or procedures set forth are merely exemplary and are not to be construed to limit the invention to any particular means of practicing the same.

These examples illustrate the hydrothermal preparation of a suitable high temperature phase hydrated calcium silicate compound coupled with the subsequent aluminum sulfate treatment which comprises inventive subject matter of this application.

*Example 1*

Eighty-five lbs. of diatomaceous earth suspended in 60 gals. of water was charged to a reactor, steam preheated to a temperature of 450° F. and drained of condensate. Upon return of the reactor temperatures to 450° F., 100 lbs. of hydrated lime in 60 gals. of water (giving a calculated $CaO/SiO_2$ mol ratio of approximately 1.0) was added thereto and the temperature again raised to 450° F. and maintained there for about 1½ hours. Finally, 18½ lbs. of paper-maker's alum in 40 gals. of water (0.024 mol of hydrated aluminum sulfate per mol of CaO) was added to the reactor and maintained therein for approximately ½ hour for a total reaction time of 2 hours at a temperature of 450° F. The product was then drained into a holding tank and filtered over a rotary vacuum filter, oven dried and pulverized.

*Example II*

An aluminum sulfate treated xonotlite calcium silicate was prepared by maintaining an aqueous suspension of 1800 gals. of diatomaceous earth slurry comprising 0.63 lb. of diatomite per gal. and about 680 gals. of lime slurry comprising 1.46 lbs. of CaO per gal. in a reaction vessel for 1½ hours at a temperature of about 460° F. The relative proportions of lime and siliceous components thereof were calculated to give a $CaO/SiO_2$ mol ratio of 1.0. Upon completion of the reaction comprising 1½ hours at temperatures of about 460° F., an aqueous solution of aluminum sulfate comprising 2.0 lbs. per gal. was added to the reaction vessel until the aluminum sulfate content thereof reached 2.4 lbs. per lb. of CaO component of the calcium silicate (about 0.20 mol of hydrated aluminum sulfate per mol of CaO) and the combined reaction mixture was maintained at a temperature of approximately 460° F. for an additional period of about 30 minutes. The contents of the reactor were then filtered, dried and ground.

*Example III*

A suitable high pressure reactor vessel was first preheated with steam to a temperature of approximately 450° F. and upon draining of the condensate was charged with 85 lbs. of diatomaceous earth suspended in 60 gals. of water and the temperature was brought back to 450° F. One hundred lbs. of hydrated lime, also suspended in 60 gals. of water, was then charged to the reactor and the temperature again raised to 450° F. and held there for a 2 hour reaction period. The relative proportion of lime and siliceous material was calculated to give a CaO/SiO₂ mol ratio of 1.0. Upon completion of the reaction period the reaction product was drained into a holding tank and the total solids in the reactor slurry were determined by evaporating a known volume of the slurry to dryness to calculate the hydrated calcium silicate content thereof for subsequent treatment. Sufficient aluminum sulfate to react with about 15% of the CaO content of the calcium silicate (0.237 lb. of hydrated aluminum sulfate per lb. of hydrated calcium silicate) was dissolved in about 20 gals. of water and added to the aqueous suspension of hydrated calcium silicate in the holding tank with continuous stirring and the contents thereof maintained at a temperature of about 160° F. for 1 hour. This addition of aluminum sulfate treating agent caused the slurry to thicken considerably and it was necessary to add additional water, about half the initial slurry volume, to keep the slurry in workable condition. The treated product was filtered over a rotary vacuum filter, dried at 240° F. in an oven and ground.

The "alum demand" of the products of Examples I and II, comprising a 7½% and a 60% aluminum sulfate treated xonotlite in accordance with this invention, Example III, comprising a 7½% conventionally treated xonotlite, and an untreated xonotlite as a standard were determined in accordance with the foregoing stated procedure, i.e., titrating 1 ml. increments of aluminum sulfate solution containing 0.0216 gram of hydrated aluminum sulfate $(Al_2(SO_2)_3.18H_2O)$ per ml. against a ½ gram sample of each of the specified aluminum sulfate treated calcium silicate products and the untreated xonotlite slurried in 400 mls. of water and determining the pH after stirring for 5 minutes. The results of the foregoing test were plotted on a graph for comparison of the "alum demand" of the untreated calcium silicate xonotlite and those treated according to prior practices. These results comprise the graph of FIG. 1. The "alum demand" is expressed as the mls. of aluminum sulfate solution which must be added to reduce the pH of the slurry to 5.0.

*Example IV*

Three identical samples of a low temperature phase hydrated calcium silicate compound identified in the art as the phase calcium silicate hydrate I (Taylor, Journal of the Chemical Society, 163, 1953) were prepared by reacting hydrated lime and a siliceous material in a mol ratio of 0.6CaO to 1SiO₂ at a temperature of 350–360° F. for a period of about 2 hours. Sample 1 was retained untreated as a standard. The second sample was treated with sufficient aluminum sulfate to react with 7½% of the lime content thereof at ambient temperatures. The third sample was retained in the reactor and treated with sufficient aluminum sulfate to react with 7½% of the lime content thereof at temperatures in the vicinity of 350–360° F. The "alum demand" of each sample, determined exactly in accordance with the foregoing procedure, was plotted for comparsion and comprises the graph of FIG. 2 of the drawing. This experiment accordingly demonstrates that only the higher temperature (above about 370° F., preferably approximately 450° F.) phase calcium silicates can be made resistant to acidic conditions by treatment with aluminum sulfate.

*Example V*

A series of hydrothermal synthesis of high temperature phase hydrated calcium silicate products comprising reacting lime and siliceous reactants in CaO/SiO₂ mol ratios varying progressively from 0.5 to 1.0CaO to 1SiO₂ at temperatures of about 450° F. for a period of about 1½ hours was effected. Each of the resulting hydrated calcium silicate products thereof, comprising either xonotlite, the low solubility calcium silicate having the formula 2CaO.3SiO₂.1–2.5H₂O referred to hereinbefore or mixtures of the said compounds, were treated by adding sufficient aluminum sulfate to the reactor vessels to react with 7½% of the calcium oxide content of the specific compound and continuing the reactions for periods of about ½ hour and at temperatures of approximately 450° F. The decreasing CaO/SiO₂ mol ratios of the hydrated calcium silicate resulted in only a very slight increase in "alum demand." The "alum demand" of each of these products, determined in accordance with the foregoing test, is plotted in the graph of FIG. 3.

*Example VI*

Six identical samples of the high temperature phase calcium silicate xonotlite were prepared in accordance with the hydrothermal procedure and aluminum sulfate treatment of Example II. The respective xonotlite samples were treated with aluminum sulfate to varying degrees by maintaining each in an aqueous medium for a period of about ½ hour at a temperature of approximately 450° F. with sufficient aluminum sulfate reagent to react with about 7½%, 30%, 40%, 50%, 60% and 90% of their CaO content. The long term "alum demands" for each of the thus prepared aluminum sulfate treated calcium sulfate samples was determined for comparison and evaluation by slurrying 0.50 gram of each of said samples in 400 ml. of water, adding aluminum sulfate to each slurried sample in amount equivalent to 0.086 lb. per lb. of calcium silicate and measuring and recording the pH of each slurry sample as a function of time. The results of these tests, shown in FIG. 4, illustrate the lasting low pH properties imparted by the 60% treatment. Because of the large differences in the stability of these samples the time is plotted on a logarithmic scale.

*Example VII*

A low solubility high temperature phase hydrated calcium silicate having the formula 2CaO.3SiO₂.1–2.5H₂O was treated with 21.8 lbs. of paper-maker's alum

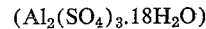

$(Al_2(SO_4)_3.18H_2O)$ per 100 lbs of the lime component in a hydrothermal reaction vessel for a period of 30 minutes at a temperature of about 450° F. This is sufficient aluminum sulfate to react with approximately 7½% of the CaO content of the calcium silicate. A comparison of the filtration rate of the foregoing alum treated hydrated calcium silicate was made with an identical untreated low solubility high temperature phase hydrated calcium silicate compound. Under identical conditions the filtration rate of the aluminum sulfate treated product was 17.4 lbs. per hour per sq. ft. whereas the untreated product gave a filtration rate of 7.95 lbs. per hour per sq. ft.

*Example VIII*

Several 5 gal. pressure reactors were each charged with 438 grams of diatomaceous earth, 151 grams of hydrated lime and 3½ gals. of water to provide a CaO/SiO₂ mol ratio of 1.0, and upon completion of each 90 minute reaction period at 450° F. producing the stable high temperature phase hydrated calcium silicate xonotlite, aluminum sulfate was added to each reactor in ½ gal. of water and after an additional ½ hour reaction at 450° F. the product was drained from each reactor, filtered, dried and ground. The aluminum sulfate treatments were carried out at theoretical levels of 3, 6 and 30% of the amount of aluminum sulfate required to react with the CaO content of the calcium silicate (a 100% aluminum sulfate treatment requiring 1 mol of aluminum sulfate per 3 mols of calcium oxide of the calcium silicate product). When about 6% or greater aluminum sulfate was used, the final "alum demand" of the product was found to be less than 0.14 lb. aluminum sulfate per lb. of calcium silicate, at the 3% level of treatment the "alum demand" was considerably higher.

It should be understood that the present disclosure is for the purpose of illustration only and that this invention includes all modifications and equivalents which fall within the scope of the appended claims.

What we claim is:

1. An improved method of preparing an aluminum sulfate treated, particulate hydrated calcium silicate product comprising hydrothermally reacting at a temperature of at least about 350° F. stable, hydrothermally formed, high temperature phase hydrated calcium silicates with aluminum sulfate in proportions of at least 0.0166 mol of aluminum sulfate per mol of CaO to effect reaction of at least 5% by weight of the total CaO component of the hydrated calcium silicates with the aluminum sulfate.

2. An improved method of preparing an aluminum sulfate treated, particulate hydrated calcium silicate product comprising hydrothermally reacting at a temperature of at least about 350° F. stable, hydrothermally formed, high temperature phase hydrated calcium silicates with aluminum sulfate in proportions of at least approximately 0.025 mol of aluminum sulfate per mol of CaO to effect reaction of approximately 7½ to 60% by weight of the total CaO component of the hydrated calcium silicates with the aluminum sulfate.

3. An improved method of preparing an aluminum sulfate treated, particulate hydrated calcium silicate product comprising hydrothermally reacting at a temperature of approximately 450° F. stable, hydrothermally formed, high temperature phase hydrated calcium silicates with aluminum sulfate in proportions of at least 0.0166 mol of aluminum sulfate per mol of CaO to effect reaction of at least 5% by weight of the total CaO component of the hydrated calcium silicates with the aluminum sulfate.

4. An improved method of preparing an aluminum sulfate treated, particulate hydrated calcium silicate product comprising hydrothermally reacting at a temperature of approximately 450° F. stable, hydrothermally formed, high temperature phase hydrated calcium silicates with aluminum sulfate in proportions of at least approximately 0.025 mol of aluminum sulfate per mol of CaO to effect reaction of approximately 7½ to 60% by weight of the total CaO component of the hydrated calcium silicates with the aluminum sulfate.

5. An improved method of preparing an aluminum sulfate treated, particulate hydrated calcium silicate product comprising hydrothermally reacting at a temperature of approximately 450° F. stable, hydrothermally formed, high temperature phase hydrated calcium silicates with aluminum sulfate in proportions of at least approximately 0.025 mol of aluminum sulfate per mol of CaO to effect reaction of approximately 7½% by weight of the total CaO component of the hydrated calcium silicates with the aluminum sulfate.

6. An improved method of preparing an aluminum sulfate treated, particulate hydrated calcium silicate product comprising hydrothermally reacting at a temperature of approximately 450° F. stable, hydrothermally formed, high temperature phase hydrated calcium silicates with aluminum sulfate in proportions of approximately 0.20 mol of aluminum sulfate per mol of CaO to effect reaction of approximately 60% by weight of the total CaO component of the hydrated calcium silicates with the aluminum sulfate.

7. An improved method of preparing an aluminum sulfate treated, particulate hydrated calcium silicate product comprising hydrothermally reacting at a temperature of at least about 350° F. stable, hydrothermally formed, high temperature phase hydrated calcium silicates selected from the group consisting of xonotlite and a synthetic hydrated calcium silicate having the composition $$2CaO.3SiO_2.1-2.5H_2O$$

and mixtures thereof with aluminum sulfate in proportions of at least approximately 0.025 mol of aluminum sulfate per mol of CaO to effect reaction of approximately 7½ to 60% by weight of the total CaO component of the hydrated calcium silicates with the aluminum sulfate.

8. An improved method of preparing an aluminum sulfate treated, particulate hydrated calcium silicate product comprising hydrothermally reacting at a temperature of approximately 450° F. stable, hydrothermally formed, high temperature phase hydrated calcium silicates selected from the group consisting of xonotlite and a synthetic hydrated calcium silicate having the composition $$2CaO.3SiO_2.1-2.5H_2O$$

and mixtures thereof with aluminum sulfate in proportions of at least approximately 0.025 mol of aluminum sulfate per mol of CaO to effect reaction of approximately 7½ to 60% by weight of the total CaO component of the hydrated calcium silicates with the aluminum sulfate.

9. A method of buffering the basic pH characteristics of stable, hydrothermally formed, high temperature phase hydrated calcium silicate products which comprises hydrothermally reacting at a temperature of at least about 350° F. stable, hydrothermally formed, high temperature phase hydrated calcium silicates with aluminum sulfate in proportions of at least 0.0166 mol of aluminum sulfate per mol of CaO to effect reaction of approximately 7½% by weight of the total CaO component of the hydrated calcium silicates with the aluminum sulfate.

10. A method of buffering the basic pH characteristics of stable, hydrothermally formed, high temperature phase hydrated calcium silicate products which comprises hydrothermally reacting at a temperature of approximately 450° F. stable, hydrothermally formed, high temperature phase hydrated calcium silicates with aluminum sulfate in proportions of at least 0.0166 mol of aluminum sulfate per mol of CaO to effect reaction of approximately 60% by weight of the total CaO component of the hydrated calcium silicates with the aluminum sulfate.

11. A method of buffering the basic pH characteristics of stable, hydrothermally formed, high temperature phase hydrated calcium silicate products which comprises hydrothermally reacting at a temperature of approximately 450° F. stable, hydrothermally formed, high temperature phase hydrated calcium silicates with aluminum sulfate in proportions of at least approximately 0.025 mol of aluminum sulfate per mol of CaO to effect reaction of approximately 7½ to 60% by weight of the total CaO component of the hydrated calcium silicates with the aluminum sulfate.

12. A method of buffering the basic pH characteristics of stable, hydrothermally formed, high temperature phase hydrated calcium silicate products which comprises hydrothermally reacting at a temperature of at least about 350° F. stable, hydrothermally formed, high temperature phase hydrated calcium silicates selected from the group consisting of xonotlite and a synthetic hydrated calcium silicate having the composition $2CaO.3SiO_2.1-2.5H_2O$ and mixtures thereof with aluminum sulfate in proportions of at least approximately 0.025 mol of aluminum sulfate per mol of CaO to effect reaction of approximately 7½ to 60% by weight of the total CaO component of the hydrated calcium silicates with aluminum sulfate.

13. A method of buffering the basic pH characteristics of stable, hydrothermally formed, high temperature phase hydrated calcium silicate products which comprises hydrothermally reacting at a temperature of approximately 450° F. stable, hydrothermally formed, high temperature phase hydrated calcium silicates selected from the group consisting of xonotlite and a synthetic hydrated calcium silicate having the composition $2CaO.3SiO_2.1-2.5H_2O$ and mixtures thereof with aluminum sulfate in proportions of at least approximately 0.025 mol of aluminum sulfate per mol of CaO to effect reaction of approximately 7½ to 60% by weight of the total CaO component of the hydrated calcium silicates with aluminum sulfate.

14. A particulate hydrated calcium silicate product consisting essentially of stable, hydrothermally formed, high temperature phase hydrated calcium silicates and the hydrothermal reaction product of said high temperature phase hydrated calcium silicates and aluminum sulfate in proportions of at least 0.0166 mol of aluminum sulfate per mol of CaO at a temperature of at least about 350° F. to effect reaction of at least 5% by weight of the total CaO component of the hydrated calcium silicate with the aluminum sulfate, said product exhibiting an "alum demand" no greater than approximately 4 ml. of an aqueous solution of 0.0216 gram of aluminum sulfate per ml. to achieve a pH of about 5.

15. A particulate hydrated calcium silicate product consisting essentially of stable, hydrothermally formed, high temperature phase hydrated calcium silicates and the hydrothermal reaction product of said high temperature phase hydrated calcium silicates and aluminum sulfate in proportions of at least 0.0166 mol of aluminum sulfate per mol of CaO at a temperature of approximately 450° F. to effect reaction of at least 5% by weight of the total CaO component of the hydrated calcium silicate with the aluminum sulfate, said product exhibiting an "alum demand" no greater than approximately 4 ml. of an aqueous solution of 0.0216 gram of aluminum sulfate per ml. to achieve a pH of about 5.

16. A particulate hydrated calcium silicate product consisting essentially of stable, hydrothermally formed, high temperature phase hydrated calcium silicates and the hydrothermal reaction product of said high temperature phase hydrated calcium silicates and aluminum sulfate in proportions of at least approximately 0.025 mol of aluminum sulfate per mol of CaO at a temperature of at least about 350° F. to effect reaction of approximately 7½ to 60% by weight of the total CaO component of the hydrated calcium silicate with the aluminum sulfate, said product exhibiting an "alum demand" no greater than approximately 4 ml. of an aqueous solution of 0.0216 gram of aluminum sulfate per ml. to achieve a pH of about 5.

17. A particulate hydrated calcium silicate product consisting essentially of stable, hydrothermally formed, high temperature phase hydrated calcium silicates and the hydrothermal reaction product of said high temperature phase hydrated calcium silicates and aluminum sulfate in proportions of at least approximately 0.025 mol of aluminum sulfate per mol of CaO at a temperature of approximately 450° F. to effect reaction of approximately 7½ to 60% by weight of the total CaO component of the hydrated calcium silicate with the aluminum sulfate, said product exhibiting an "alum demand" no greater than approximately 4 ml. of an aqueous solution of 0.0216 gram of aluminum sulfate per ml. to achieve a pH of about 5.

18. A particulate hydrated calcium silicate product consisting essentially of stable, hydrothermally formed, high temperature phase hydrated calcium silicates selected from the group consisting of xonotlite and a synthetic hydrated calcium silicate having the composition $$2CaO.3SiO_2.1-2.5H_2O$$

and mixtures thereof and the hydrothermal reaction product of the said high temperature phase hydrated calcium silicates and mixtures thereof and aluminum sulfate in proportions of at least approximately 0.025 mol of aluminum sulfate per mol of CaO at a temperature of at least about 350° F. to effect reaction of approximately 7½ to 60% by weight of the total CaO component of the hydrated calcium silicates with the aluminum sulfate, said product exhibiting an "alum demand" no greater than approximately 4 ml. of an aqueous solution of 0.0216 gram aluminum sulfate per ml. to achieve a pH of about 5.

19. A particulate hydrated calcium silicate product consisting essentially of stable, hydrothermally formed, high temperature phase hydrated calcium silicates selected from the group consisting of xonotlite and a synthetic hydrated calcium silicate having the composition $$2CaO.3SiO_2.1-2.5H_2O$$

and mixtures thereof and the hydrothermal reaction product of the said high temperature phase hydrated calcium silicates and mixtures thereof and aluminum sulfate in proportions of at least approximately 0.025 mol of aluminum sulfate per mol of CaO at a temperature of approximately 450° F. to effect reaction of approximately 7½ to 60% by weight of the total CaO component of the hydrated calcium silicates with the aluminum sulfate, said product exhibiting an "alum demand" no greater than approximately 4 ml. of an aqueous solution of 0.0216 gram aluminum sulfate per ml. to achieve a pH of about 5.

References Cited in the file of this patent
UNITED STATES PATENTS

| | | |
|---|---|---|
| 2,263,606 | Balassa | Nov. 25, 1941 |
| 2,314,188 | R. Allen | Mar. 16, 1943 |
| 2,786,758 | Taylor | Mar. 26, 1957 |
| 2,786,777 | E. Allen | Mar. 26, 1957 |
| 2,888,377 | E. Allen | May 26, 1959 |
| 2,920,974 | E. Allen | Jan. 12, 1960 |

FOREIGN PATENTS

| | | |
|---|---|---|
| 566,191 | Canada | Nov. 18, 1958 |

UNITED STATES PATENT OFFICE
CERTIFICATE OF CORRECTION

Patent No. 3,052,563                            September 4, 1962

Carl R. Vander Linden et al.

It is hereby certified that error appears in the above numbered patent requiring correction and that the said Letters Patent should read as corrected below.

Column 3, line 8, for "d=8.3 A." read -- d=8.34 A. --; line 28, for "componud" read -- compound --.

Signed and sealed this 15th day of January 1963.

(SEAL)
Attest:

ERNEST W. SWIDER
Attesting Officer

DAVID L. LADD
Commissioner of Patents